United States Patent
Bao et al.

(10) Patent No.: US 12,014,463 B2
(45) Date of Patent: Jun. 18, 2024

(54) DATA ACQUISITION AND RECONSTRUCTION METHOD AND SYSTEM FOR HUMAN BODY THREE-DIMENSIONAL MODELING BASED ON SINGLE MOBILE PHONE

(71) Applicant: IMAGE DERIVATIVE INC., Zhejiang (CN)

(72) Inventors: Hujun Bao, Hangzhou (CN); Jiaming Sun, Hangzhou (CN); Yunsheng Luo, Hangzhou (CN); Zhiyuan Yu, Hangzhou (CN); Hongcheng Zhao, Hangzhou (CN); Xiaowei Zhou, Hangzhou (CN)

(73) Assignee: IMAGE DERIVATIVE INC., Hangzhou (CN)

( * ) Notice: Subject to any disclaimer, the term of this patent is extended or adjusted under 35 U.S.C. 154(b) by 0 days.

(21) Appl. No.: 18/542,825

(22) Filed: Dec. 18, 2023

(65) Prior Publication Data
US 2024/0153213 A1  May 9, 2024

Related U.S. Application Data

(63) Continuation of application No. PCT/CN2022/125581, filed on Oct. 17, 2022.

(30) Foreign Application Priority Data

Jul. 6, 2022 (CN) .......................... 202210788579.7

(51) Int. Cl.
G06T 17/20 (2006.01)
G06T 7/73 (2017.01)
(Continued)

(52) U.S. Cl.
CPC ................ G06T 17/20 (2013.01); G06T 7/73 (2017.01); G06T 7/80 (2017.01); G06T 7/90 (2017.01);
(Continued)

(58) Field of Classification Search
None
See application file for complete search history.

(56) References Cited

U.S. PATENT DOCUMENTS

| 2014/0327613 A1 | 11/2014 | Chessa et al. |
| 2018/0253895 A1 | 9/2018 | Arumugam |

(Continued)

FOREIGN PATENT DOCUMENTS

| CN | 113421328 A | 9/2021 |
| CN | 114004941 A | 2/2022 |

(Continued)

OTHER PUBLICATIONS

Park et al. "Nerfies: Deformable Neural Radiance Fields" ICCV paper by Computer Vision Foundation (Year: 2021).*

(Continued)

*Primary Examiner* — Tapas Mazumder
(74) *Attorney, Agent, or Firm* — W&G Law Group

(57) ABSTRACT

A data acquisition and reconstruction method and a data acquisition and reconstruction system for human body three-dimensional modeling based on a single mobile phone. In the aspect of data acquisition, the present application only uses a single smart phone, and uses augmented reality technology to guide users to collect high-quality video data input for a reconstruction algorithm, so as to ensure that the subsequent human body reconstruction algorithm can stably obtain a high-quality three-dimensional human body model. In the aspect of a reconstruction algorithm, the present application designs a deformable implicit neural radiance (Continued)

field. The use of an implicit spatial deformation field estimation model solves the problem that the subject has small motion in the process of collecting data with a single mobile phone; the implicit signed distance field is used to represent human geometry, which has rich expressive ability and improves the accuracy of three-dimensional human model reconstruction.

6 Claims, 3 Drawing Sheets

(51) Int. Cl.
  *G06T 7/80* (2017.01)
  *G06T 7/90* (2017.01)
  *G06T 19/00* (2011.01)
(52) U.S. Cl.
  CPC ........ *G06T 19/006* (2013.01); *G06T 2200/08* (2013.01); *G06T 2207/10016* (2013.01); *G06T 2207/10024* (2013.01); *G06T 2207/20084* (2013.01); *G06T 2207/30201* (2013.01)

(56) References Cited

U.S. PATENT DOCUMENTS

| | | | | |
|---|---|---|---|---|
| 2021/0299560 | A1* | 9/2021 | Shen | G06T 19/20 |
| 2022/0078335 | A1* | 3/2022 | Lin | H04N 23/61 |
| 2022/0101614 | A1 | 3/2022 | Luo et al. | |
| 2022/0405448 | A1* | 12/2022 | Mezghanni | G06F 30/17 |

FOREIGN PATENT DOCUMENTS

| | | |
|---|---|---|
| CN | 114118367 A | 3/2022 |
| CN | 114119839 A | 3/2022 |
| CN | 114241113 A | 3/2022 |
| CN | 114245000 A | 3/2022 |
| CN | 114581571 A | 6/2022 |
| CN | 114648613 A | 6/2022 |
| CN | 114863037 A | 8/2022 |
| WO | 2021037257 A1 | 3/2021 |
| WO | 2022104299 A1 | 5/2022 |
| WO | 2022121220 A1 | 6/2022 |

OTHER PUBLICATIONS

Deng et al., "Deformed Implicit Field: Modeling 3D Shapes with Learned Dense Correspondence" CVPR 2021 Paper by Computer Vision Foundation (Year: 2021).*
Bhatnagar et al., "Combining Implicit Function Learning and Parametric Models for 3D Human Reconstruction" Computer Vision—ECCV 2020: 16th European Conference, Glasgow, UK, Aug. 23-28, 2020 . . . printed in https://arxiv.org/pdf/2007.11432.pdf (Year: 2021).*
International Search Report (PCT/CN2022/125581); dated Mar. 4, 2023.
First Office Action(CN202210788579.7); dated Aug. 19, 2022.
Notice Of Allowance(CN202210788579.7); dated Sep. 8, 2022.
A-Comparison-Between-3D-Reconstruction-Using-NERF-Networks-and-MVS-Algorithms-on-Cultural-Heritage-Images.
Mesh-Deformation-Based-3D-Facial-Modeling-From-Images.
A-Comparison-Between-3D-Reconstruction-Using-NERF-Neural-Networks-and-MVS-Algorithms-on-Cultural-Heritage-Images.

* cited by examiner

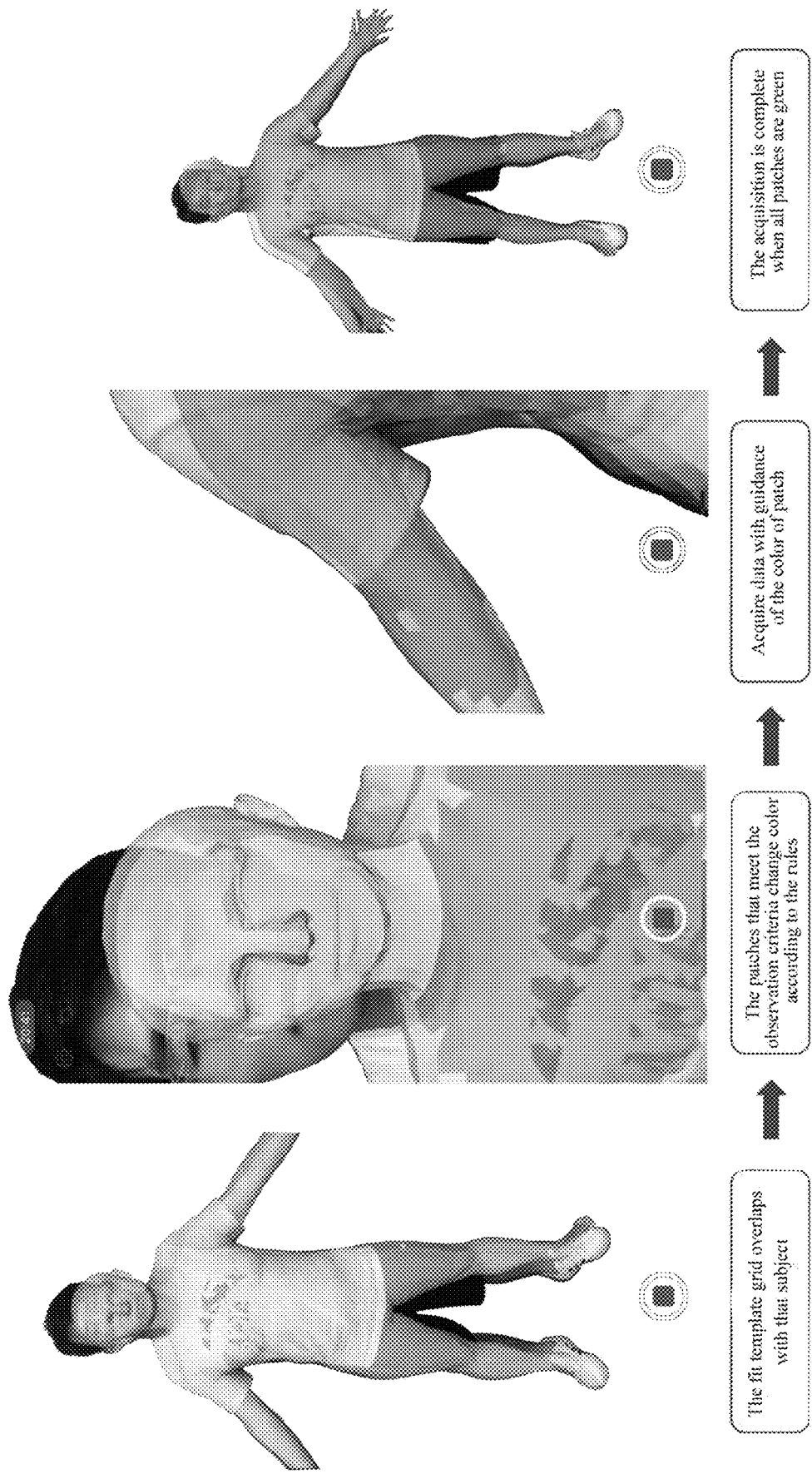

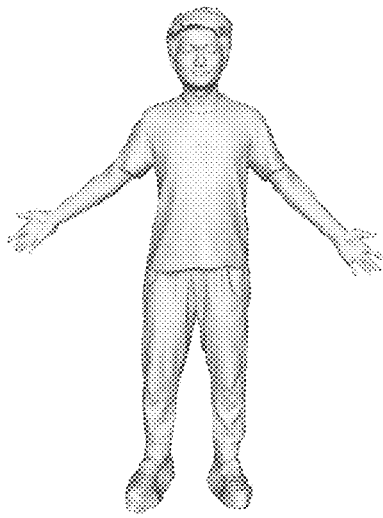
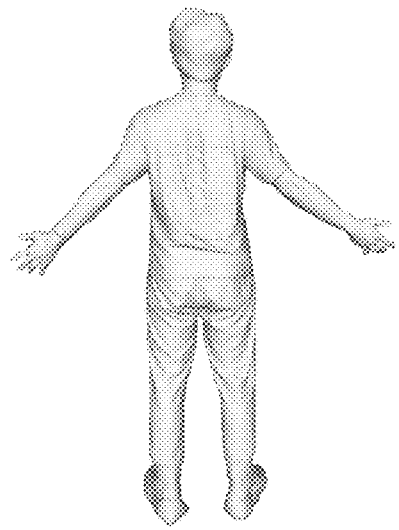
FIG. 3(A)　　　　　　　　　FIG. 3(B)
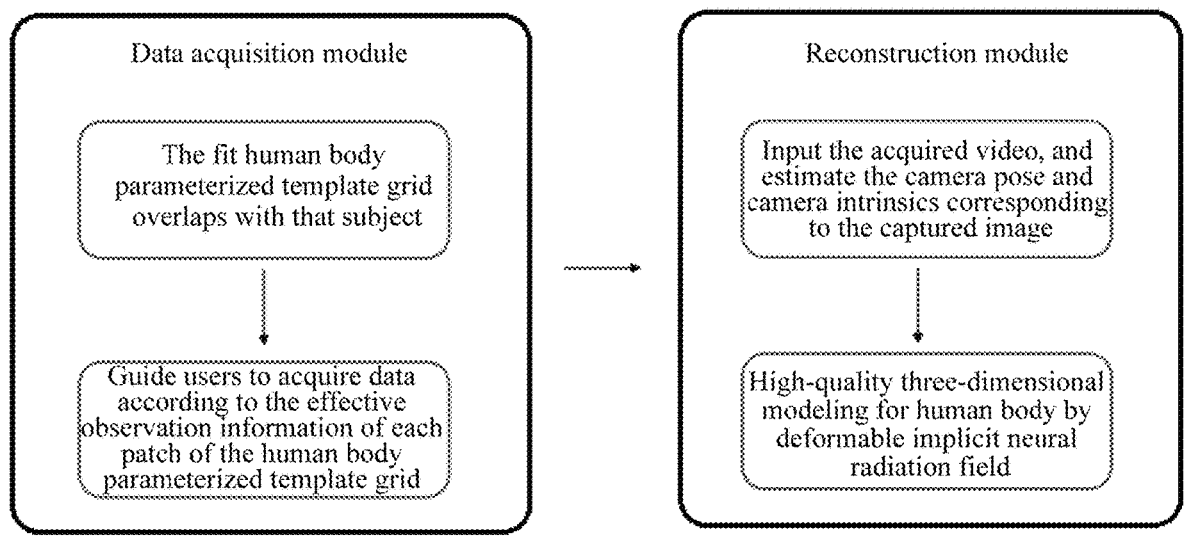
FIG. 4

DATA ACQUISITION AND RECONSTRUCTION METHOD AND SYSTEM FOR HUMAN BODY THREE-DIMENSIONAL MODELING BASED ON SINGLE MOBILE PHONE

CROSS-REFERENCE TO RELATED APPLICATIONS

The present application is a National Phase of International Application No. PCT/CN2022/125581, filed on Oct. 17, 2022, which claims priority to Chinese Application No. 202210788579.7, filed on Jul. 6, 2022, the contents of both of which are incorporated herein by reference in their entireties.

TECHNICAL FIELD

The present application belongs to the field of computer vision, in particular to a data acquisition and reconstruction method and system for human body three-dimensional modeling based on a single mobile phone.

BACKGROUND

Human body reconstruction is the basis of interactive immersive applications such as virtual reality and augmented reality content creation, film and television creation and virtual try-on. High-quality human body reconstruction is the premise of many application scenarios related to digital people in virtual reality and augmented reality. At present, there are two kinds of human body acquisition and reconstruction solutions: scanning the human body with a professional multi-camera acquisition system to acquire data, which is very expensive and occupies a large area, limiting the large-scale use and commercialization of high-precision human body reconstruction. Another method uses a single portable device, such as a smart phone, instead of a professional device for image acquisition, and uses a multi-view stereo reconstruction method for human body reconstruction. This kind of method has a weak ability to deal with the texture-less part of a human body, and cannot model the tiny movements of the human body in the process of acquisition, which easily leads to low integrity of reconstruction results and cannot meet the requirements of high-precision human body reconstruction.

SUMMARY

The object of the present application is to provide a method and a system for data acquisition and reconstruction of human body three-dimensional modeling based on a single mobile phone, so as to solve the problems existing in the traditional static human body model reconstruction solution.

The purpose of the present application is achieved through the following technical solution:

A first aspect of the present application provides a data acquisition and reconstruction method for human body three-dimensional modeling based on a single mobile phone, including the following steps:

S1, data acquisition based on augmented reality technology, including:

S1.1, a subject standing in a scene, a user capturing 360° view on the subject with a mobile phone, fitting a human parametric template mesh according to a body shape and a posture of the subject from multiple view angles, and rendering the human parametric template mesh in a scene position where the subject stands by augmented reality technology, so as to approximately achieve a visual effect that the human parametric template mesh and the subject are overlapped;

S1.2, guiding the user for a data acquisition process by using the fitted human parametric template mesh, determining whether the observation of a single face on the human parametric template mesh at a current perspective is effective or not in the data acquisition process, changing a color mark of the face when the single face is effectively observed by a sufficient number of perspectives, indicating to the user that the acquisition at the position of the face has been completed, and moving the perspective of the user to the part of the human parametric template mesh that has not been sufficiently observed;

S2, reconstruction of a three-dimensional human model based on a deformable implicit neural radiance field, comprising:

S2.1, extracting a video acquired in S1.2 into a series of image sequences captured around a human body, and estimating a camera pose and camera intrinsics corresponding to acquired images according to a matching relationship of feature points among the images;

S2.2, using the deformable implicit neural radiance field to model the human body in three dimensions, and optimizing an implicit spatial deformation field estimation model, an implicit signed distance field estimation model and an implicit color estimation model by means of volume rendering to obtain a three-dimensional human body model.

Further, in step S1.1, the subject stands in the center of the scene, keep a posture with spread human body surface which is conducive to reconstruction, and the user captures 360° view on the subject for one circle with the mobile phone.

Further, the step S1.1 specifically includes the following steps.

Running a localization and mapping algorithm to obtain the camera pose in real time during data acquisition.

Running a human keypoint detection algorithm to obtain human keypoint positions on the captured images in real time.

Fitting the human parametric template mesh to the captured positions according to the camera pose and the human body keypoint positions, so as to achieve the visual effect that the human parametric template mesh and the subject are overlapped visually, and completing data acquisition according to the guidance of the human parametric template mesh.

Further, in the step S1.2, the step of determining whether the observation of a single face at a current perspective is effective or not includes the following steps.

Calculating a distance between an optical center of the camera and a center point of the face based on a real-time localization result of the camera.

If the distance is less than a set distance threshold, considering that the face meets a distance standard for effective observation at the current perspective.

Calculating a connecting line between the optical center of the camera and the center point of the face based on the real-time localization result of the camera, wherein if an angle between the connecting line and a normal vector of the face is less than a predefined angle threshold, it is considered that the face meets the angle standard for effective observation at the current perspective.

Further, in the step S1.2, if a face meets both the distance threshold and the line-of-sight angle standard for effective observation at a certain perspective, an effective observation count of the face is increased by one; if the effective observation count of the face reaches a set number threshold, it is considered that the face has an enough number of observations, the color mark of the face is changed, and the user is indicated that acquisition at the position of this face has been completed; the camera is moved to acquire data in areas that have not been observed enough; when all faces on the human parametric template grid change in color, the data acquisition process is completed.

Further, the step S2.1 specifically includes the following steps: performing sparse reconstruction for the image sequences by a structure from motion method, wherein an input of the structure from motion method is a series of image frames captured by the mobile phone around the human body, and an output is the camera pose and camera intrinsics corresponding to these images and sparse point clouds reconstructed according to these images.

Further, the step S2.2 specifically includes the following steps:

Establishing the implicit signed distance field estimation model for expressing a canonical shape in a canonical space using a neural network;

Establishing the implicit color estimation model for observing colors of three-dimensional points from a specific direction in the canonical space by the neural network.

Establishing the implicit spatial deformation field estimation model from an observation frame coordinate system corresponding to each image frame to the canonical space by the neural network.

Optimizing the implicit spatial deformation field estimation model, the implicit signed distance field estimation model and the implicit color estimation model based on the camera pose and camera intrinsics corresponding to the images obtained in S2.1 by volume rendering on an input image set to obtain an implicit three-dimensional human body model.

Post-processing an implicit signed distance field of the deformable implicit neural radiance field by an isosurface extraction method to obtain an explicit three-dimensional human model.

Further, in the step S2.2, an input of the implicit spatial deformation field estimation model is a coordinate of a three-dimensional point in the observation frame coordinate system, and an output is a coordinate of the three-dimensional point in a canonical coordinate system; an input of the implicit signed distance field estimation model is a coordinate of the three-dimensional point in the canonical space, and the output is signed distance and geometric characteristics of the three-dimensional point; an input of the implicit color estimation model is geometric feature of the three-dimensional point output by the implicit signed distance field estimation model and a vector representing a view direction, and an output is a color of each sampling point along a specific line of sight estimated by the model; and a density of sampling points is calculated according to a signed distance of each sampling point, and a rendering result is obtained by volume rendering technology according to the density and color of sampling points.

Further, in the step S2.2, deformation codes and implicit spatial deformation field estimation model, the implicit signed distance field estimation model and the implicit color estimation model of each observation frame are updated by back propagation according to a loss function of image reconstruction and a regularization loss function of the signed distance field.

According to a second aspect of the present application, there is provided a data acquisition and reconstruction method for human body three-dimensional modeling based on a single mobile phone, including a data acquisition module and a reconstruction module.

The data acquisition module is used to virtually place a human parametric template mesh in an acquisition scene by augmented reality technology so that a user acquires video data following a visual guidance on the human parametric template mesh, and extract image frames from the video data and sent to the reconstruction module.

The reconstruction module is used to estimate a camera pose and camera intrinsics corresponding to all image frames, use a deformable implicit neural radiance field to model a human body in three dimensions, and optimize an implicit spatial deformation field estimation model, an implicit signed distance field estimation model and an implicit color estimation model by volume rendering to obtain a three-dimensional human body model.

The present application has the following beneficial effects:

In terms of data acquisition, the present application can only use a single smart phone, and guides users to acquire high-quality video data input for the reconstruction algorithm by augmented reality technology, so as to ensure that the subsequent human body reconstruction algorithm can stably obtain a high-quality three-dimensional human body model.

In terms of reconstruction algorithms, the present application designs a deformable implicit neural radiance field; the use of an implicit spatial deformation field estimation model solves the problem that the subject has small motion in the process of data acquisition with a single mobile phone; the implicit signed distance field is used to represent human geometry, which has rich expressive ability and improves the accuracy of three-dimensional human model reconstruction.

By combining data acquisition and reconstruction algorithm, the present application realizes reliable data acquisition and reconstruction for human body high-quality three-dimensional modeling based on a single mobile phone.

BRIEF DESCRIPTION OF DRAWINGS

FIGS. 2($a$), 2($b$), 2($c$) and 2($d$) show a flow chart and effect of a data acquisition part according to an embodiment of the present application;

FIGS. 3($a$) and 3($b$) show effect of a still human body reconstruction result according to an embodiment of the present application; and FIG. 4 is a structural diagram of a data acquisition and reconstruction system for human body three-dimensional modeling based on a single mobile phone according to an embodiment of the present application.

DESCRIPTION OF EMBODIMENTS

Figure 1:
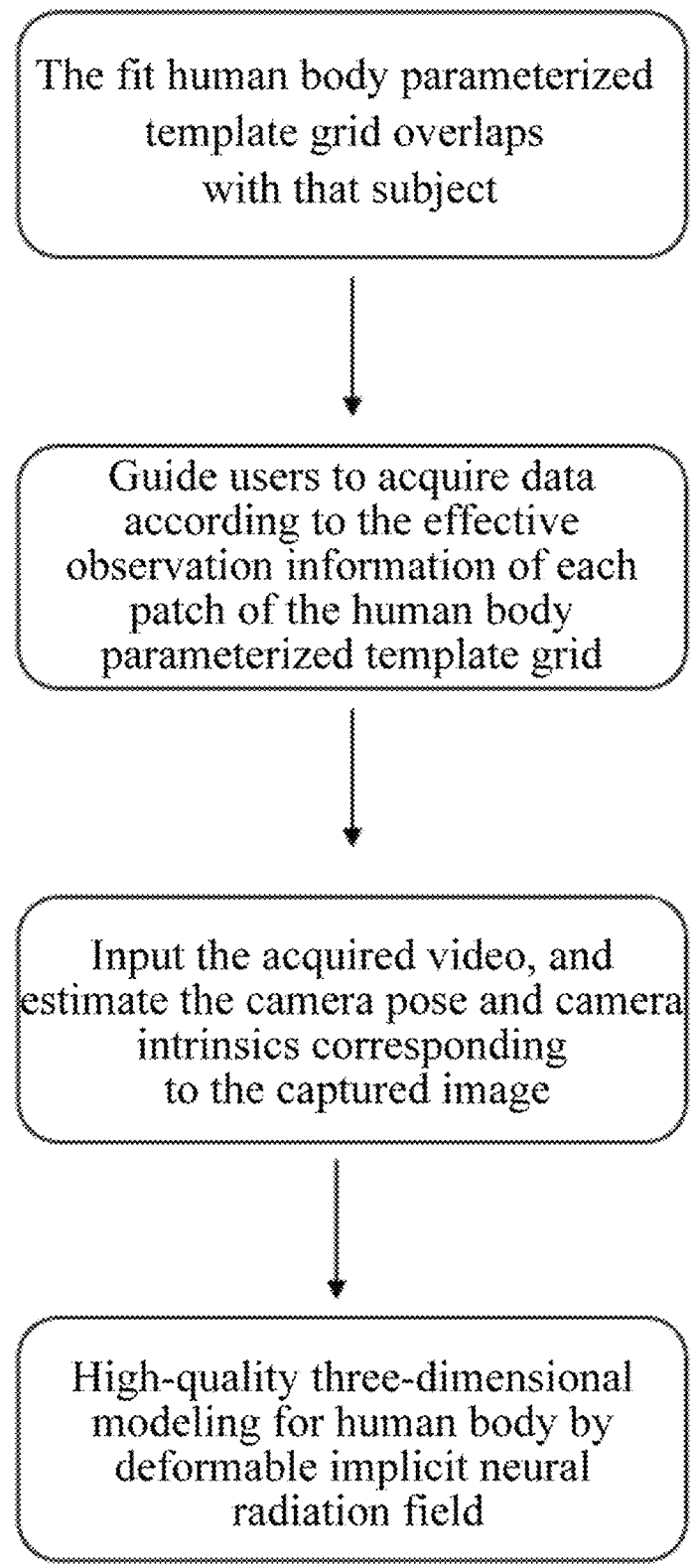
FIG. 1 is a flowchart of a data acquisition and reconstruction method for human body three-dimensional modeling based on a single mobile phone according to an embodiment of the present application.

The technical solution in the embodiment of the present application will be described below clearly and completely with reference to the attached drawings. Obviously, the described embodiments are only part of, not all of the embodiments of the present application. Based on the embodiments of the present application, all other embodiments obtained by those skilled in the art without creative labor shall belong to the protection scope of the present application.

In the field of three-dimensional mannequin reconstruction, traditional image-based methods either need complex acquisition equipment and environment construction, or are limited by the reconstruction ability of traditional multi-view geometric methods, and cannot reconstruct high-quality three-dimensional mannequins with only a single portable device. The present application provides a high-quality three-dimensional human body model reconstruction method based on a deformable implicit neural radiance field, optimizes the data acquisition process for the specific task of human body reconstruction, provides a data acquisition method for high-quality three-dimensional human body modeling by augmented reality technology, and designs data acquisition applications to guide users to efficiently acquire high-quality data for human body reconstruction.

An embodiment of the present application provides a data acquisition and reconstruction method for human body three-dimensional modeling based on a single mobile phone, which mainly includes two parts: data acquisition based on augmented reality technology and high-quality three-dimensional human body model reconstruction based on a deformable hidden nerve radiation field. The method flow is shown in FIG. 1, and the specific implementation steps are as follows:

S1, data are acquired based on augmented reality technology, and the process is shown in FIGS. 2(a), 2(b), 2(c) and 2(d).

S1.1, the subject stands in the center of the scene during the video acquisition process, and keep a posture that is conducive to reconstruction, such as maintaining a A-shaped posture. The user opens the data acquisition application in this embodiment using a mobile phone and captures 360 degrees view on the subject for one circle. During this process, the data acquisition application will run the real-time localization and mapping algorithm and the human keypoint detection algorithm in the background to obtain the camera pose and the human keypoints in the captured image in real time. According to the results of camera localization and keypoints of human body, this embodiment will automatically fit a human parametric template mesh according to the body shape and posture of the subject, and use augmented reality technology to render the human parametric template mesh in the scene where the subject is standing, so as to approximately achieve the visual effect that the human parametric template mesh and the subject are overlapped.

In an embodiment, the human parametric template mesh can adopt any existing human parametric template mesh model, and the method of fitting the human parametric template mesh can adopt any existing method of fitting the human parametric template mesh from continuous image frames.

S1.2, the human parametric template mesh obtained based on fitting in S1.1 is used to guide the user's data acquisition process, with the purpose of ensuring that every face on the human parametric template mesh is observed enough.

In the case that the parameterized template grid of human body and the subject are approximately are overlapped, each face on the parameterized template grid of human body is sufficiently observed, which means that the subject is sufficiently observed by acquired data. The validity of observation is measured by the distance between the optical center of the camera and the face and the angle between the camera line of sight and the normal vector of the face. The following details the specific standards and practical methods.

For a single face, based on the real-time localization result of the camera, the distance between the optical center of the camera and the center point of this face can be calculated. When this distance is less than a set distance threshold (which is set to one meter in this embodiment), it is considered that this face meets the distance standard for effective observation at the current perspective.

For a single face, based on the real-time localization result of the camera, the connecting line between the optical center of the camera and the center point of the face can be calculated. If the angle between the connecting line and the normal vector of the face is less than a set line-of-sight angle threshold (which is set to be 60 in this embodiment), it is considered that the face meets the line-of-sight angle standard for effective observation at the current perspective.

If a face meets both the distance standard and the line-of-sight angle standard for effective observation under the observation of a certain perspective, the effective observation count of the face is increased by one; if the effective observation count of the face reaches a set number threshold (which is set to 5 in this embodiment), it is considered that there are enough observations on the face, and the color mark of the face is changed. In this embodiment, the color of the face is changed from white to green, indicating to the user that the acquisition of the location of the face has been completed, and the mobile camera can acquire data of areas that have not been sufficiently observed. When all the faces on the human parametric template grid have turned green, the data acquisition process is completed, and the video will be automatically exported to the subsequent reconstruction process.

S2, a high-quality three-dimensional human model reconstruction is carried out based on deformable implicit neural radiance field.

S2.1, the video captured in S1.2 is extracted into a series of image sequences captured around the human body, and the camera pose, camera intrinsics and sparse point clouds corresponding to the acquired images are estimated according to the matching relationship of feature points among the images.

This step can be based on any existing structure from motion method. This step can take the real-time localization result of the camera obtained in S1 as a priori, and further optimize it based on a structure from motion method.

S2.2, the human body is modeled with high precision by using a deformable implicit neural radiance field, which includes an implicit spatial deformation field estimation model R, an implicit signed distance field estimation model S, and an implicit color estimation model G.

In an embodiment, the input of the implicit spatial deformation field estimation model R is the coordinate of a three-dimensional point in the observation frame coordinate system, and the output is the coordinate of the three-dimensional point in the canonical coordinate system. The input of the implicit signed distance field estimation model Sc is the coordinate of the three-dimensional point in the canonical space, and the output is the signed distance and geometric characteristics of the three-dimensional point, which represents the distance from the three-dimensional point to the human surface. The input of the implicit color estimation model C, is the geometric characteristics of the three-dimensional point and a vector representing the line of sight output by Sc, and the output is the color of each sampling point along a specific line of sight estimated by the model. The implicit spatial deformation field estimation model R, the implicit signed distance field estimation model S, and the implicit color estimation model C, can all adopt the common residual neural network model. After the signed distance and color of three-dimensional point are obtained from the above Sc and C, the pixel values of two-dimensional images can be rendered by volume rendering technology. The details will be given below:

the use of the volume rendering technology needs to sample $N_c$ three-dimensional points x ($N_c$=64 in this embodiment) in the observation frame coordinate system along the line of sight in space. Firstly, the implicit spatial deformation field estimation model R is used to obtain the coordinate of the three-dimensional point corresponding to the coordinate in the observation frame coordinate system in the canonical coordinate system.

$$R:(x,d_I) \to x_c$$

where x represents the three-dimensional point in the observation frame coordinate system, $x_c$ represents the three-dimensional point in the canonical space, and $d_I$ represents the specific deformation coding of the observation frame for processing different human motions in each frame; this c deformation coding can be optimized during the back propagation of the neural network.

The implicit signed distance field estimation model $S_c$ learns the signed distance $d_{sdf}$ and geometrical characteristic $z_{geo}$ of the three-dimensional point.

$$S_c:(x_c) \to \{d_{sdf}, z_{geo}\}$$

The corresponding density ρ(t) can be calculated according to the signed distance $d_{sdf}$ of each three-dimensional point.

$$\rho(t) = \max\left(-\frac{d\Phi_s(S_c(x_c(T)))}{\Phi_s(S_c(x_c(t)))}, 0\right)$$

where t is a sampling step along the line-of-sight direction, $x_c(t)$ represents the coordinate of the three-dimensional point when the sampling step along the line-of-sight direction is t, $S_c(x_c(t))$ is a signed distance value of the three-dimensional point $x_c(t)$, and $\Phi_s(\cdot)$ is a Sigmoid function.

Then, this method inputs the geometric characteristic $z_{geo}$ output by the line-of-sight direction and the implicit signed distance field estimation model $S_c$ into the implicit color estimation model $C_c$ and outputs the color of each sampling point along the line-of-sight direction v.

$$C_c(v,x_c(t)) \to C_c(v,z_{geo},n) \to RGB$$

where v represents the line of sight direction calculated by the camera pose coefficient, $z_{geo}$ represents the geometric characteristics output by the implicit signed distance field estimation model at $x_c(t)$, n represents the normal vector direction at $x_c(t)$, which can be obtained from derivation on the estimated signed distance field, and RGB represents the three-channel colors of three-dimensional point.

After obtaining the estimated density and color at each sampling point, a rendering result C(w,h) can be obtained by the following integration method:

$$C(w, h) = \int_{t_n}^{t_f} T(t) \cdot \rho(t) \cdot C_c(v, x_c(t)) dt$$

where C(w,h) represents the rendered color value at the two-dimensional image (w,h), $t_f$ and $t_n$ respectively represent the farthest and nearest sampling steps along the line-of-sight direction, $C_c(v,x_c(t))$ is the color value of $x_c(t)$ in the line-of-sight direction v, and T(t) represents the permeability at $x_c(t)$, which is obtained from integration of ρ(t):

$$T(t) = \exp\left(-\int_{t_n}^t \rho(u) du\right)$$

Finally, the image C rendered by the deformable implicit neural radiance field and the original image I are used together to calculate the image authenticity loss function $\mathcal{L}_{photo}$:

$$\mathcal{L}_{photo} = \sum_{w=0}^{W} \sum_{h=0}^{H} \|I(w, h) - C(w, h)\|$$

where W and H represent the width and height of the input image respectively, and (w,h) represents the pixel coordinate of the image.

In addition to the image authenticity loss function, the present application also adds a signed distance field regularization loss function $\mathcal{L}_{reg}$ to constrain the estimated signed distance field to retain the mathematical property that the normal vector modulus of the center point in the signed distance field is 1:

$$\mathcal{L}_{reg} = \frac{1}{aN_c} \sum_{k,i} (\|\nabla S_c(\hat{p}_{k,i})\| - 1)^2$$

where a is the number of sight lines and $N_c$ is the number of sampling points on a single sight line, and this formula constrains that the normal vector modulus of all sampling points should be 1. $\hat{p}_{k,i}$ is the three-dimensional point coordinate of the $i^{th}$ sampling point of the $k^{th}$ line of sight traversed, and $S_c(\hat{p}_{k,i})$ is the signed distance value of the three-dimensional point $\hat{p}_{k,i}$.

By combining the image authenticity loss function $\mathcal{L}_{photo}$ and the signed distance field regularization loss function $\mathcal{L}_{reg}$, a complete loss function $\mathcal{L}$ is obtained:

$$\mathcal{L} = \mathcal{L}_{photo} + \mathcal{L}_{reg}$$

The loss function value is used to update the parameters by back propagation for the neural network and the deformation coding of each observation frame.

S2.3, the implicit signed distance field of the deformable implicit neural radiance field is post-processed by an iso-surface extraction method, and a high-quality explicit three-dimensional human model is obtained.

FIGS. 3(a) and 3(b) are effect diagrams of the reconstruction result of a still human body according to an embodiment of the present application.

The present application also provides an embodiment of a data acquisition and reconstruction system for human body three-dimensional modeling based on a single mobile phone, corresponding to the embodiment of a data acquisition and reconstruction method for human body three-dimensional modeling.

Referring to FIG. 4, the data acquisition and reconstruction system human body for three-dimensional modeling based on a single mobile phone according to the embodiment of the present application includes a data acquisition module and a reconstruction module.

The data acquisition module is used to virtually place a human parametric template mesh in an acquisition scene by augmented reality technology so that a user acquires video data following a visual guidance on the human parametric template mesh, and extract image frames from the video data and sent to the reconstruction module; refer to the above step S1 for the implementation of this module.

The reconstruction module is used to estimate a camera pose and camera intrinsics corresponding to all image frames, use a deformable implicit neural radiance field to model a human body in three dimensions, and optimize an implicit spatial deformation field estimation model, an implicit signed distance field estimation model and an implicit color estimation model by volume rendering to obtain a three-dimensional human body model; refer to the above step S2 for the implementation of this module.

In one embodiment, a computer device is proposed, which includes a memory and a processor; computer-readable instructions are stored in the memory, and when the computer-readable instructions are executed by the processor, the processor is caused to execute the steps in the data acquisition and reconstruction method for human body three-dimensional modeling based on a single mobile phone in the above embodiment.

In one embodiment, a storage medium storing computer-readable instructions is proposed, and when the computer-readable instructions are executed by one or more processors, the one or more processors execute the steps in the data acquisition and reconstruction method for human body three-dimensional modeling based on a single mobile phone in the above embodiment. The storage medium can be a non-volatile storage medium.

Those skilled in the art can appreciate that all or part of the steps in various methods of the above embodiments can be completed by instructing related hardware by a program, which can be stored in a computer-readable storage medium, which can include a read-only memory, a random access memory, a magnetic disk or an optical disk, etc.

It should also be noted that the terms "including", "include" or any other variation thereof are intended to cover non-exclusive inclusion, so that a process, method, commodity or equipment including a series of elements includes not only those elements, but also other elements not explicitly listed, or elements inherent to such process, method, commodity or equipment. Without more restrictions, an element defined by the phrase "including one" does not exclude the existence of other identical elements in the process, method, commodity or equipment including the element.

The above is only a preferred embodiment of one or more embodiments of this specification, and it is not intended to limit one or more embodiments of this specification. Any modification, equivalent substitution, improvement and the like made within the spirit and principle of one or more embodiments of this description shall be included in the scope of protection of one or more embodiments of this description.

What is claimed is:

1. A data acquisition and reconstruction method for human body three-dimensional modeling based on a single mobile phone, comprising:

step S1, data acquisition based on augmented reality technology, comprising:

step S1.1, a subject standing in a scene, keeping a posture with spread human body surface conducive to reconstruction, a user capturing 360° view on the subject via a mobile phone, fitting a human parametric template mesh according to a body shape and a posture of the subject from multiple view angles, and rendering the human parametric template mesh in a scene position where the subject stands by augmented reality technology, so as to approach a visual effect that the human parametric template mesh and the subject are overlapped; and step S1.2, during the data acquisition, guiding the user for a data acquisition process by using the fitted human parametric template mesh, determining whether a single face on the human parametric template mesh at a current perspective is effectively observed, wherein when a face meets both the distance standard and the line-of-sight angle standard for effective observation at a certain perspective, an effective observation count of the face being increased by one; and wherein when the effective observation count of the face reaches a set number threshold, the face has an enough number of observations, the color mark of the face is changed, and the user is indicated that acquisition at a position of the face has been completed; the camera is moved to acquire data in areas that have not been observed enough; when all faces on the human parametric template grid change in color, the data acquisition process is completed;

step S2, reconstruction of a three-dimensional human model based on a deformable implicit neural radiance field, comprising:

step S2.1, extracting a video acquired in S1.2 into a series of image sequences captured around a human body, and estimating a camera pose and camera intrinsics corresponding to captured images according to a matching relationship of feature points among the images; and step S2.2, modelling a human body in three dimensions using the deformable implicit neural radiance field, wherein the deformable implicit neural radiance field comprises an implicit spatial deformation field estimation model, an implicit signed distance field estimation model and an implicit color estimation model;

establishing the implicit spatial deformation field estimation model from an observation frame coordinate system corresponding to each image frame to a canonical space using a neural network, wherein an input of the implicit spatial deformation field estimation model is a coordinate of a three-dimensional point in the observation frame coordinate system, and an output of the implicit spatial deformation field estimation model is a coordinate of the three-dimensional point in a canonical coordinate system;

establishing the implicit signed distance field estimation model for expressing a canonical shape in the canonical space using the neural network, wherein an input of the implicit signed distance field estimation model is a coordinate of the three-dimensional point in the canonical space, and an output of the implicit signed distance field estimation model is a signed distance and geometric characteristics of the three-dimensional point;

establishing the implicit color estimation model for observing colors of the three-dimensional point from a specific direction in the canonical space using the neural network, wherein an input of the implicit color estimation model is geometric characteristics of the three-dimensional point and a vector representing a line of sight output by the implicit signed distance field estimation model, and an output is a color of each sampling point along a specific line of sight estimated by the model;

optimizing the implicit spatial deformation field estimation model, the implicit signed distance field estimation model and the implicit color estimation model based on the camera pose and the camera intrinsics corresponding to the images obtained in S2.1 by volume rendering on an input image set to obtain an implicit three-dimensional human body model; and post-processing an implicit signed distance field of the deformable implicit neural radiance field by an isosurface extraction method to obtain an explicit three-dimensional human model.

2. The data acquisition and reconstruction method for human body three-dimensional modeling based on a single mobile phone according to claim 1, wherein the step S1.1 comprises:

running a localization and mapping algorithm to obtain the camera pose in real time during data acquisition;

running a human keypoint detection algorithm to obtain human keypoint positions on the captured images in real time; and fitting the human parametric template mesh to captured positions according to the camera pose and the human body keypoint positions, so as to achieve the visual effect that the human parametric template mesh and the subject are overlapped visually, and completing data acquisition according to guidance of the human parametric template mesh.

3. The data acquisition and reconstruction method for human body three-dimensional modeling based on a single mobile phone according to claim 1, wherein in the step S1.2 further comprises:

calculating a distance between an optical center of a camera and a center point of the single face based on a real-time localization result of the camera, wherein when the distance is less than a set distance threshold, the face meets a distance standard for effective observation at the current perspective; and calculating a connecting line between the optical center of the camera and the center point of the face based on the real-time localization result of the camera, wherein when an angle between the connecting line and a normal vector of the face is less than a set line-of-sight angle threshold, the face meets a view direction standard for effective observation at the current perspective.

4. The data acquisition and reconstruction method for human body three-dimensional modeling based on a single mobile phone according to claim 1, wherein the step S2.1 further comprises: performing sparse reconstruction for the image sequences by a structure from motion method, wherein an input of the structure from motion method is a series of image frames captured by the mobile phone around the human body, and an output is the camera pose and camera intrinsics corresponding to the captured images and sparse point clouds reconstructed according to the captured images.

5. The data acquisition and reconstruction method for human body three-dimensional modeling based on a single mobile phone according to claim 1, wherein in the step S2.2, a deformation coding and implicit spatial deformation field estimation model, the implicit signed distance field estimation model and the implicit color estimation model of each observation frame are updated by back propagation according to a loss function of image authenticity and a regularization loss function of a signed distance field.

6. A data acquisition and reconstruction device for human body three-dimensional modeling based on a single mobile phone, for implementing a method according to claim 1.

* * * * *